Nov. 12, 1946.  N. H. ROY ET AL  2,411,139
STRAIN MEASURING AND LOAD CONTROLLING APPARATUS
Filed Nov. 18, 1943  2 Sheets-Sheet 1
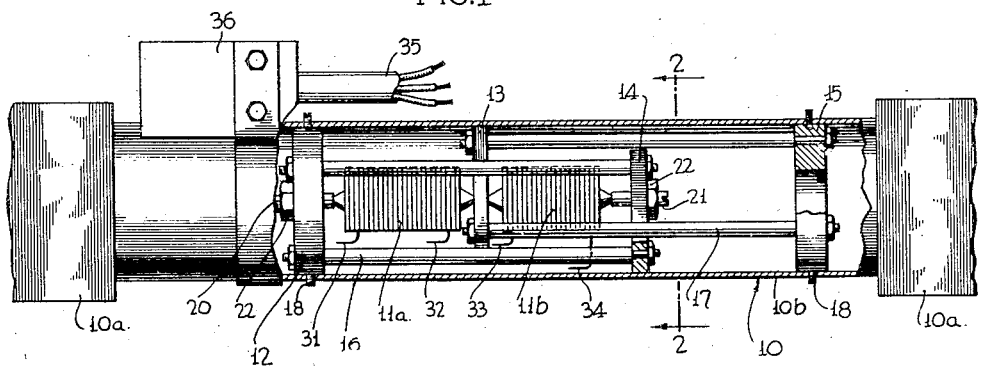
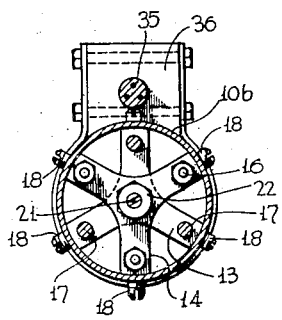
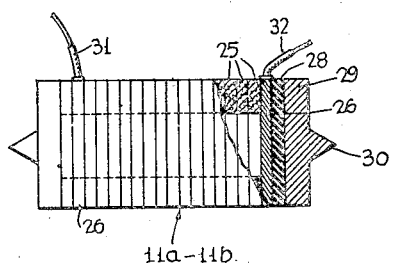
INVENTORS
Nereus H. Roy
Joseph L. Bisesi
BY John P. Tarbox
ATTORNEY Patented Nov. 12, 1946

2,411,139

UNITED STATES PATENT OFFICE 2,411,139

STRAIN MEASURING AND LOAD CONTROLLING APPARATUS

Nereus H. Roy, Glenbrook, Conn., and Joseph L. Bisesi, Floral Park, N. Y., assignors to The Budd Company, Philadelphia, Pa., a corporation of Pennsylvania Application November 18, 1943, Serial No. 510,710

8 Claims. (Cl. 201—51)

This invention relates to strain measuring and load controlling apparatus and has for an object the provision of improvements in this art.

One of the particular objects of the invention is to provide apparatus for measuring strains and controlling loads, which includes a strain measuring device which is incorporated in and becomes a part of the member under stress.

Another object is to provide a complete self-contained strain measuring device of a convenient mechanical arrangement which facilitates loading the resistance units which form the strain sensitive elements.

Another object is to provide strain measuring and load control apparatus which is adapted without alteration to register either tension or compression strains and to control the load in accordance with either.

Another object is to provide a compression type strain sensitive device which is so mounted and arranged that both compression and tension strains are always transmitted to the strain sensitive element as relative or differential compression effects.

Another object is to provide a self-contained preloaded strain sensitive unit which can be installed by simple mechanical connections as an integral part of various load carrying members.

Another object is to provide a centrally disposed strain sensitive element to which axial strain effects are transmitted in an axial direction.

Another object is to provide such a device which is not effected by vibration in use.

In the measurement of strains in structures and elements of structures, it has been common practice in the past to employ, among other types, a carbon resistor type of gage temporarily attached externally to the structure by means of screws or clamps. Due to the size and weight of these gages, it was often inadvisable to superimpose their relatively great weight on the structure. Moreover, the drilling of holes in the structure or member under test was objectionable in that the use of the member for its intended purpose might thereby be prevented.

It is apparent therefore that if a unit containing carbon resistance or other types of gages can be made part of the structure or member under test, it will be possible to eliminate the objections to the temporary external gages. The present invention provides such a unit.

The above and other objects and advantages will be apparent from the following description of an illustrative embodiment of the invention, reference being made to the accompanying drawings thereof, wherein:

Fig. 1 is an axial section and elevation of a strain measuring unit mounted as an integral part of a load-carrying member such for example as the tubular push-pull rod which operates the wing flaps of an airplane;

Fig. 2 is a transverse section taken on the line 2—2 of Fig. 1;

Fig. 3 is an enlarged side elevation, partly in section of one of the carbon pile units.

Figure 4:
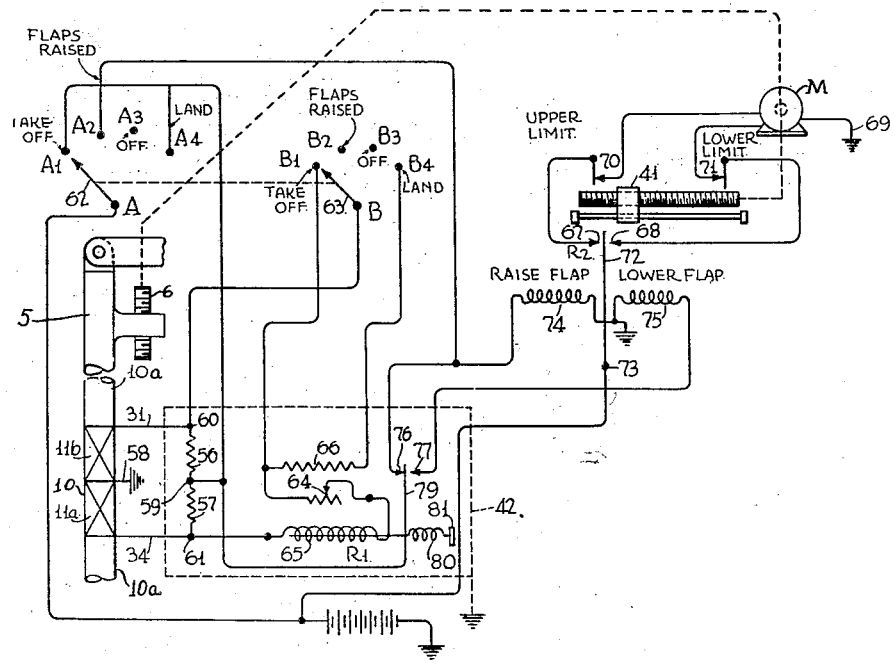
Fig. 4 is a wiring diagram of one arrangement of the apparatus.

For purposes of illustration the strain responsive and load controlling apparatus of the present invention is shown in association with airplane wing flap control means and the strain measuring unit 10 is shown to be mounted between the spaced ends 10a of the push-pull tube or rod 5 which operates the wing flaps, the pre-assembled strain responsive unit thus becoming an integral part of the load-carrying member. The motor M as indicated in Figure 4 has power connection to gear means 6 through which the push-pull or control rod 5 is axially reciprocated.

The container or enclosure 10b of the strain measuring unit 10 is shown to be a round tube of a size to fit the ends of the push-pull tube but it is evident that for other uses it may have other shapes. Within the container 10b there are mounted two carbon pile resistance units 11a, 11b. These carbon pile units are secured in the tube under pre-compression and are so arranged that when the push-pull tube 10a and the container 10b are loaded in tension the carbon pile unit 11b is subjected to an increase in compression, and unit 11a is subjected to a decrease in compression; and when the tubes 10a and 10b are loaded in compression, unit 11b is subjected to a decrease in compression and unit 11a is subjected to an increase in compression; a differential between the compression in the two carbon pile units is produced in either case, and this differential is a measure of the strain in the test member. In the present arrangement the tube may not be subject to compression at any time, but only a variation in tension; however, that causes a variation or differential between the compression in the two carbon pile units which serves the desired purpose.

The mounting means for the carbon pile units in the container 10b comprises a series of four plates 12, 13, 14 and 15 and two sets of connecting rods 16 and 17. The end plates 12 and 15 are firmly secured to the tube on the inside at a distance apart as by screws 18; and the intermediate plates 13 and 14 move axially within the tubular container in response to lengthening or shortening thereof.

The left fixed plate 12 and the right floating plate 14 are secured together by the set of rods 16; and the right fixed plate 15 and the left floating plate 13 are rigidly secured together by the set of rods 17. Each floating plate 13, or 14, is cut away to allow the unattached set of rods 16 or 17 to pass freely thereby and may be generally Y or triangular shaped with three spider arms as shown in Fig. 2.

The floating plate 13 is disposed between the two carbon pile units 11a and 11b, hence the set of rods 17 embraces only the pile unit 11b, whereas the floating plate 14 is disposed beyond both pile units and its set of rods 16 embraces both pile units 11a, 11b. The pile units and their plates are therefore held together as a self-contained unit by the set of rods 16.

Initial compression on the pile units 11a, 11b may be regulated by adjustment screws 20, 21 threaded in the plates 12 and 14 respectively, the adjustment screws being held in fixed position by locknuts 22.

Fig. 3 shows the details of one of the carbon pile units. It may consist of a number of carbon plates or annular rings 25, insulating plates 28 near each end, and end plates 29 with conical pointed thrust projections 30. Electrical conductors 31, 32, 33 and 34 are secured to metal washers 26 at the terminal carbon plates of the two pile units (Fig. 1). Two of the conductors, one from each unit, may be connected to a common outside lead while the other two conductors pass out separately. They emerge in a three-wire cable 35 from a junction box 36 clamped to the rod 10.

Referring to the wiring diagram of Fig. 4, the carbon pile units 11a, 11b in the tube are shown in circuit with other apparatus to provide active control of operating parts, as for example the wing flaps heretofore referred to. A grounded control box 42, which is preferably mounted to resist shocks, is indicated in dotted outline and includes two resistances 56 and 57 connected in series with the carbon pile resistances 11a and 11b. These four resistances 11a, 11b, 57 and 56 constitute the four resistances of a Wheatstone bridge circuit, current being supplied at points 58 and 59 and the output of the bridge being measured between points 60 and 61.

In order to place this bridge circuit under the control of the pilot, panel gang switches A and B are provided, each switch having four contacts numbered A1, A2, A3 and A4 for A and B1, B2, B3 and B4 for B. The pivot of the switch arm 62 of switch A is connected to the positive pole of a battery, preferably the storage battery of the airplane, with a voltage commonly of between 20 and 25 volts, the negative pole of the battery being grounded. The pivot of the switch arm 63 of the switch B is connected to bridge point 60. Contacts A1 and A4 are connected to bridge point 59. Contact B1 is connected through a temperature responsive variable resistor 64 and the coil 65 of a sensitive relay R1 to the bridge point 61. Contact B4 is connected through resistor 66 to contact B1.

It is thus apparent that with contacts A1 and B1 engaged by the mechanically connected switch arms 62 and 63, power is supplied to the bridge circuit at points 58 and 59 and variation in bridge balance voltage is applied at bridge points 60 and 61 to vary the current through the relay coil 65.

The motor M which is grounded at 69 on the negative side of the armature has dual field circuit wires to the contacts 67 and 68 of a relay R2 through the limit switches 70 and 71. Each of the switches has a spring-closed contact arm which is adapted to be opened by the push-pull rod operating screw member 41 when moved by the motor to the limiting position. The movable arm 72 of the relay R2 is pivoted at 73 and connected to the positive side of the battery. Movement of the relay arm between points 67 and 68 reverses the direction of rotation of the motor.

The relay R2 includes coils 74 and 75 connected in series with the junction point grounded, the outer ends of the coils being connected to the contacts 76 and 77 of relay R1. The arm or blade 79 of the relay R1 is biased toward the contact 77 by a spring 80, the anchorage 81 of the spring being adjustable to vary the spring tension. The pivot of the arm 79 is connected to bridge point 59. In addition to relay coil 74, switch contact A2 is also connected to the contact 76 of relay R1.

In operation, when the airplane rests on the ground the switches A and B are positioned at the "off" points A3 and B3. At take-off the switches are moved to contacts A1, B1 to energize the bridge circuit. The push-pull rod being unstrained and the bridge balanced, the relay contacts 77 and 68 are closed and the flaps are lowered by the motor M until stopped by opening the lower limit switch 71.

With the flaps down, the plane takes off and as air speed increase the tension of the flap operating rod 10 increases. This separates plates 12 and 15 within the tubular rod and increases the compression on the carbon pile unit 11b. The compression on carbon pile unit 11a is decreased.

The bridge is unbalanced and at a predetermined point where the coil 65 overcomes the spring 80 the contact 76 of relay R1 is closed and the motor is energized to raise the flaps. When the tension pressure is relieved sufficiently by raising the flaps the prior connections are reestablished and the motor again lowers the flaps. This alternate flap movement continues until the airplane is well in the air.

The pilot then moves the yoked switches to contacts A2, B2 which takes the carbon pile units out of circuit and raises the flaps to their upper limiting position where they stay.

For landing, the same general situation as for take-off prevails except that a higher speed and greater rod tension may be permitted. The switches are turned to contacts A4, B4 and a resistance 66 is cut in circuit with relay coil 65 and more unbalance between the carbon pile units 11a, 11b is required to unbalance the bridge circuit enough to raise the flaps than the case of take-off.

With the same arrangement, should the push-pull rod be loaded in compression instead of tension the distance between the plates 12 and 15 will shorten and the compression on carbon pile unit 11a will be increased while the compression on the carbon pile 11b will decrease to give a differential effect in the bridge circuit and thus operates the controls.

It will thus be seen that the invention provides a very simple and effective strain control device in general and a number of specific improvements in detail. The carbon pile units are held together in compression as a unit in the tubular container and the container with the pile units is a complete entity which can be built and tested at the factory and installed as an integral part of any desired operating mechanism. Not only does the present apparatus measure the loads on a member but it effectively and immediately regulates the imposed load.

While one embodiment has been illustrated and described it will be understood that the invention may have various embodiments within the limits of the prior art and the scope of the subjoined claims.

What is claimed is:

1. In load controlling apparatus in combination, a load-taking member, a pair of carbon pile electrical resistance units mounted therein, and connections between said member and said units for differentially affecting said units with change in length of said member, said connections comprising spaced plates secured to said member, floating plates between said fixed plates, and rod sets connected each to a different floating plate and a different fixed plate.

2. In load controlling apparatus in combination, a load-taking member, a pair of carbon pile electrical resistance units mounted therein, and connections between said member and said units for differentially affecting said units with change in length of said member, said connections comprising two spaced plates fixed to said member, two floating plates between said fixed plates, one floating plate being disposed between units and the other between a unit and one of said fixed plates, and rod sets connected each to a different fixed plate and a different floating plate.

3. In load controlling apparatus in combination, a load-taking member, a pair of carbon pile electrical resistance units mounted therein, and connections between said member and said units for differentially affecting said units with change in length of said member, said connections comprising two spaced plates fixed to said member, two floating plates between said fixed plates, one floating plate being disposed between units and the other between a unit and one of said fixed plates, and rod sets connected each to a fixed plate and a floating plate and extending by the other floating plate.

4. In load controlling apparatus in combination, a tubular load-taking member, a pair of carbon pile electrical resistance units mounted therein in axial alignment with each other, and connections between said member and said units for differentially affecting said units with change in length of said member at points axially external to said units, said connections comprising two spaced plates fixed to said member, two floating plates between said fixed plates, one floating plate being disposed between units and the other between a unit and one of said fixed plates, and rod sets connected each to a different fixed plate and a different floating plate.

5. In load controlling apparatus, a unitary self contained strain responsive unit adapted to be inserted as a link of a load transmitting member comprising a link member adapted to be connected at each end to the load transmitting member for load transmission, and at least two variable electrical resistance elements mounted on said link member in axial series alignment with each other, the adjoining ends of two of said elements being attached to a first common point on said load member and the corresponding outer ends of said two elements being attached to a second point on said load member displaced from said first point.

6. Apparatus as set forth in claim 5 further characterized by the fact that said variable resistance element comprises a pair of differential compression carbon pile units formed as a self-contained unit with two rod sets and four supporting plates including two end plates with the end plates only attached to said container.

7. In load controlling apparatus, a unitary self contained strain responsive unit adapted to be inserted as a link of a load transmitting member comprising two resistance elements variable in resistance with degree of strain and connected in physical series, the outer ends of said series elements being connected to a common first point on said load member and the inner ends of the elements being connected to a common second point on said load member displaced from the first point.

8. In load controlling apparatus, a unitary self contained strain responsive unit adapted to be inserted as a link of a load transmitting member comprising two resistance elements variable in resistance with degree of pressure and connected in physical series, the outer ends of said series elements being connected to a common first point on said load member adjacent one outer element end and the inner ends of the elements being connected to a common second point on said load member displaced from the first point and adjacent the other outer element end.

NEREUS H. ROY.
JOSEPH L. BISESI.